(12) United States Patent
Mu

(10) Patent No.: US 11,545,834 B1
(45) Date of Patent: Jan. 3, 2023

(54) BALANCING POWER FROM ELECTRIC VEHICLE IN VEHICLE-TO-BUILDING SUPPLY

(71) Applicant: Atieva, Inc., Newark, CA (US)

(72) Inventor: Mingkai Mu, Fremont, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 17/452,660

(22) Filed: Oct. 28, 2021

(51) Int. Cl.
*H02M 5/458* (2006.01)
*H02J 3/32* (2006.01)
*B60L 53/60* (2019.01)
*B60L 55/00* (2019.01)

(52) U.S. Cl.
CPC .............. *H02J 3/322* (2020.01); *B60L 53/60* (2019.02); *B60L 55/00* (2019.02); *B60L 2210/30* (2013.01)

(58) Field of Classification Search
CPC ....................................................... H02J 3/332
See application file for complete search history.

(56) References Cited

U.S. PATENT DOCUMENTS

| | | | |
|---|---|---|---|
| 6,008,589 A | 12/1999 | Deng et al. | |
| 9,365,122 B2 | 6/2016 | Kajouke et al. | |
| 10,414,283 B2 | 9/2019 | Kudo et al. | |
| 2004/0062059 A1 | 4/2004 | Cheng et al. | |
| 2004/0095784 A1* | 5/2004 | Zhou | H02M 5/458 363/37 |
| 2011/0103113 A1 | 5/2011 | Ganev et al. | |
| 2014/0049998 A1 | 2/2014 | Casey et al. | |
| 2015/0183330 A1 | 7/2015 | Rajagopalan et al. | |
| 2016/0268916 A1* | 9/2016 | Ramsay | H04L 43/087 |
| 2018/0222333 A1 | 8/2018 | Khaligh et al. | |
| 2021/0044146 A1* | 2/2021 | Dong | H02J 3/46 |
| 2021/0078435 A1 | 3/2021 | Van De Water | |
| 2021/0126550 A1* | 4/2021 | Yenduri | H02M 5/4585 |
| 2021/0194356 A1* | 6/2021 | Afridi | H02M 3/1582 |
| 2021/0237612 A1 | 8/2021 | Blaser et al. | |

OTHER PUBLICATIONS

T. Tzou et al.: "Full Control of a PWM DC-AC Converter for AC Voltage Regulation," IEEE Transactions on Aerospace and Electronic Systems, vol. 34, No. 4, Oct. 1998, pp. 1218-1226.

* cited by examiner

*Primary Examiner* — Jared Fureman
*Assistant Examiner* — Esayas G Yeshaw
(74) *Attorney, Agent, or Firm* — Brake Hughes Bellermann LLP

(57) ABSTRACT

A gateway system for a building comprises: a first relay to couple a first line of the gateway system to a first grid line of a power grid; a second relay to couple a second line of the gateway system to a second grid line of the power grid; a neutral line coupled to a neutral grid line of the power grid; a first electric-vehicle (EV) line coupled to the first line of the gateway system, the first EV line configured for being coupled to a first line of an EV charging connector; a second EV line coupled to the second line of the gateway system, the second EV line configured for being coupled to a second line of the EV charging connector, wherein the EV charging connector has no neutral line; and a balancing converter coupled to the first and second lines of the gateway system.

15 Claims, 3 Drawing Sheets

BALANCING POWER FROM ELECTRIC VEHICLE IN VEHICLE-TO-BUILDING SUPPLY

TECHNICAL FIELD

This document relates to balancing power from an electric vehicle in a vehicle-to-building supply.

BACKGROUND

Many buildings are connected to a power grid for supplying electric power to run the building. However, power grids are susceptible to uncertain continuity and may temporarily be shut down, or operate at reduced effect, with little or short notice.

In recent years, electric vehicle (EV) technology has continued to develop, and an increasing number of people are choosing to have an EV as a personal vehicle.

SUMMARY

In a first aspect, a gateway system for a building comprises: a first relay to couple a first line of the gateway system to a first grid line of a power grid; a second relay to couple a second line of the gateway system to a second grid line of the power grid; a neutral line coupled to a neutral grid line of the power grid; a first electric-vehicle (EV) line coupled to the first line of the gateway system, the first EV line configured for being coupled to a first line of an EV charging connector; a second EV line coupled to the second line of the gateway system, the second EV line configured for being coupled to a second line of the EV charging connector, wherein the EV charging connector has no neutral line; and a balancing converter coupled to the first and second lines of the gateway system.

Implementations can include any or all of the following features. The balancing converter is based on power electronics. The power electronics include an AC/AC converter coupled to the first and second EV lines, and to the first and second lines of the gateway system. The power electronics include at least first and second AC/DC converters, and a DC capacitor. Each of the first and second AC/DC converters is bidirectional. The first AC/DC converter includes: an AC terminal coupled to the first line of the gateway system; a first DC terminal coupled to a first terminal of the DC capacitor; a second DC terminal; and a neutral terminal coupled to the neutral line; and the second AC/DC converter includes: an AC terminal coupled to the second line of the gateway system; a first DC terminal coupled to the first DC terminal of the first AC/DC converter; a second DC terminal coupled to a second terminal of the DC capacitor; and a neutral terminal coupled to the neutral line.

In a second aspect, a method comprises: detecting, by a gateway system, that a power grid is no longer providing power to first and second lines of the gateway system; detecting, by the gateway system, that an electric vehicle (EV) is providing power through first and second EV lines coupled to the first and second lines of the gateway system, respectively, wherein the EV has no neutral line; and balancing, by the gateway system using a balancing converter, the power from the EV between the first and second lines of the gateway system.

Implementations can include any or all of the following features. The balancing converter is based on power electronics. The power electronics include an AC/AC converter coupled to the first and second EV lines, and to the first and second lines of the gateway system. The power electronics include at least first and second AC/DC converters, and a DC capacitor. The method further comprises opening, by the gateway system and in response to detecting that the power grid is no longer providing power to the first and second lines of the gateway system, at least one relay that couples the first and second lines of the gateway system to first and second grid lines of the power grid, respectively, wherein the power grid further includes a neutral grid line. The method further comprises detecting, by the gateway system and after detecting that the EV is providing power, that the power grid is again providing power to the first and second lines of the gateway system. The method further comprises causing, by the gateway system and after detecting that the power grid is again providing power, the EV to stop providing power through the first and second EV lines. The first and second EV lines run through EV supply equipment, the method further comprising opening, by the gateway system and after detecting that the power grid is again providing power, a relay in the EV supply equipment.

In a third aspect, a gateway system for a building comprises: a first relay to couple a first line of the gateway system to a first grid line of a power grid; a second relay to couple a second line of the gateway system to a second grid line of the power grid; a neutral line coupled to a neutral grid line of the power grid; a first electric-vehicle (EV) line coupled to the first line of the gateway system, the first EV line configured for being coupled to a first line of an EV charging connector; a second EV line coupled to the second line of the gateway system, the second EV line configured for being coupled to a second line of the EV charging connector, wherein the EV charging connector has no neutral line; and power electronics means for balancing power from the first and second EV lines between the first and second lines of the gateway system.

BRIEF DESCRIPTION OF DRAWINGS

Like reference symbols in the various drawings indicate like elements.

DETAILED DESCRIPTION

Figure 1:
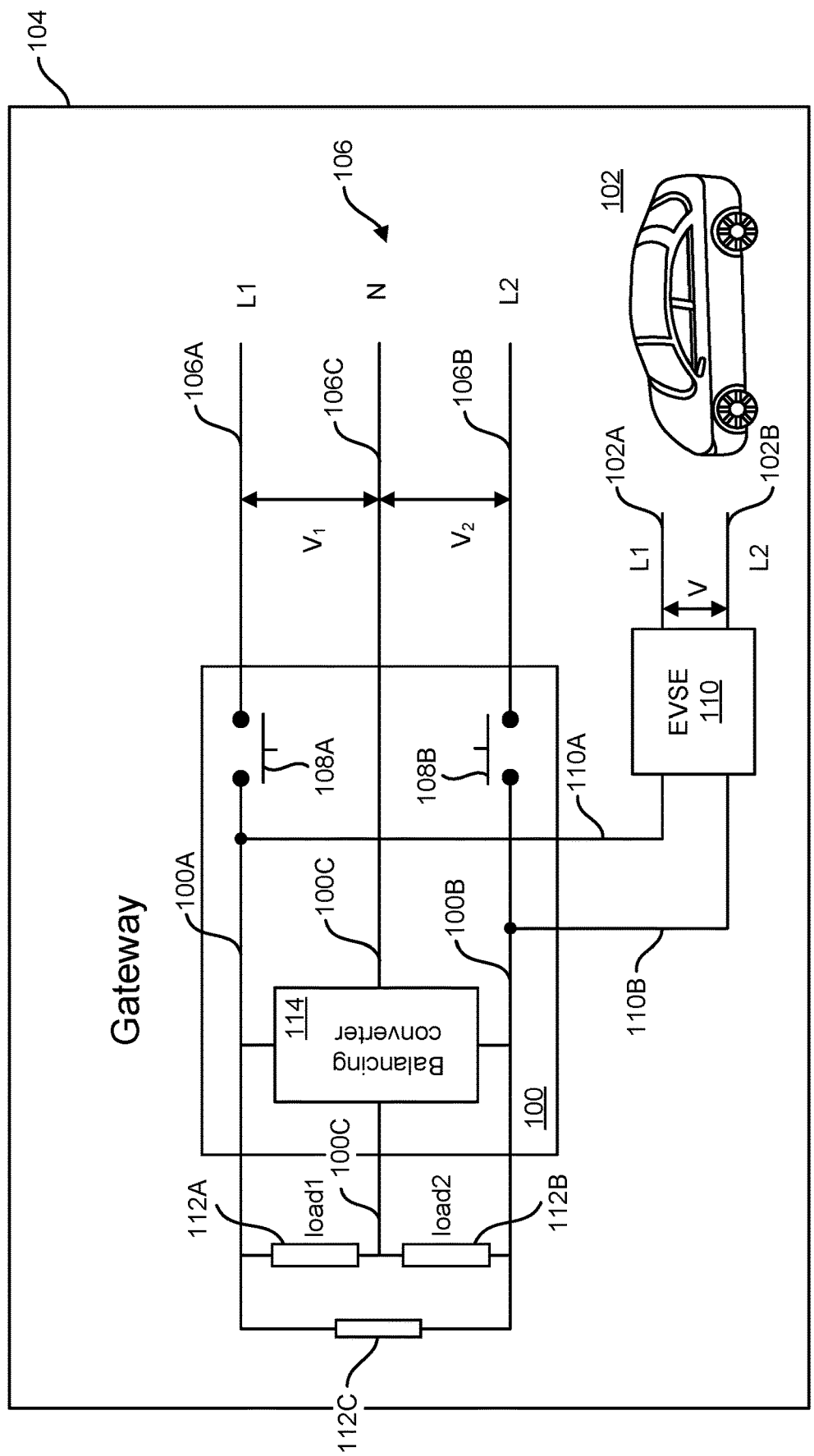
FIG. 1 shows an example of a gateway system that can balance power from an EV in a vehicle-to-building operating mode.

This document describes examples of systems and techniques for balancing the power supplied from an EV that has no neutral connection. A circuit and system can be configured to balance a line voltage from the EV when the EV is operating in a vehicle-to-building supply mode. In some implementations, the EV can serve as a power source for a building by discharging energy from its battery pack into the building's electric circuit, thereby supporting the electrical operation of one or more loads on that circuit. For example, the EV can be placed into vehicle-to-building supply mode when the building's ordinary power grid is not connected or is temporarily out of service. Equipment that is exemplified herein is sometimes referred to as a "gateway" system for a building. This term can signify that the system may be positioned at the point where the power grid enters the building, and the system can in a sense form an entry point for electric energy supplied from the grid.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. An EV can be powered exclusively by electricity, or can use one or more other energy sources in addition to electricity, to name just a few examples. As used herein, an EV includes an onboard energy storage, sometimes referred to as a battery pack, to power one or more electric motors. Two or more EVs can have different types of energy storages and/or different sizes thereof.

Examples herein refer to alternating current (AC) or direct current (DC). Different voltage levels and current levels can be used for each of AC and DC. The example voltages mentioned herein are for illustrative purposes only. Converters that operate at least in part based on AC can be referred to as an AC/DC converter, a DC/AC converter, or an AC/AC converter, respectively. An AC/DC converter or a DC/AC converter can be bidirectional, meaning that it can convert AC to DC and also convert DC to AC. Any bidirectional converter can referred to as AC/DC or as DC/AC as a matter of preference, for example based on which direction of conversion is being discussed.

Examples described herein refer to a building. As used herein, a building includes any of multiple types of structures that at least in part rely on electrical power. A building can be intended primarily for residential use, for commercial use, or for public use, to name a few examples.

Examples described herein refer to a power grid. As used herein, a power grid that supplies power to a building includes any of multiple types of networks for delivering electricity from a producer to one or more consumers. A power grid can be owned and/or operated by any of multiple types of actors, including, but not limited to, a public entity (e.g., a municipality, city, state, or country), or a private entity (e.g., a corporation, another private enterprise, or an individual). A power grid can deliver AC to a building at any of multiple levels of power.

Examples described herein describes certain components of an electric circuit as being coupled to each other. As used herein, being coupled means to be electrically coupled, unless otherwise stated.

FIG. 1 shows an example of a gateway system 100 that can balance power from an EV 102 in a vehicle-to-building operating mode. The gateway system 100 and/or the EV 102 can be used with one or more other examples described elsewhere herein. The gateway system 100 can be installed at a building 104 that is here schematically illustrated.

The building 104 can be supplied with electricity by a power grid 106. The power grid 106 is configured to furnish power using a grid line 106A (sometimes referred to as L1), a grid line 106B (sometimes referred to as L2), and a neutral line 106C (sometimes referred to as N). The power grid 106 can deliver power using a split phase. A voltage $V_1$ can be provided between the grid lines 106A and 106C. For example, the voltage $V_1$ can be about 120V. A voltage $V_2$ can be provided between the grid lines 106B and 106C. For example, the voltage $V_2$ can be about 120V.

The gateway system 100 can include a line 100A for the grid line 106A; a line 100B for the grid line 106B; and a line 100C for the grid line 106C. The gateway system 100 can include a relay 108A to couple the line 100A and the grid line 106A to each other, and a relay 108B to couple the line 100B and the grid line 106B to each other. The line 100C can be coupled to the grid line 106C without a relay.

The EV 102 includes an energy storage (e.g., a battery pack of electrochemical cells). The EV 102 includes an onboard charger that can be used when charging and/or discharging the energy storage. For example, when the EV 102 is coupled to an AC power supply, the onboard charger can convert the supplied AC to DC, and provide the DC to charge the energy storage. As another example, when the energy storage of the EV 102 is being discharged, the onboard charger can convert the DC from the energy storage to AC that can power one or more electric components. In the present disclosures, examples will be given of using the AC that is provided by the EV 102 to supply power to the building 104.

The building 104 can have an EV supply equipment (EVSE) 110 (sometimes referred to as a charging station). The EVSE 110 can include circuitry and processing components for interacting with the EV 102, and can provide a charging connector (e.g., at the end of an electric cable) that is compatible with a charge port of the EV 102. For example, the EVSE 110 can receive information about what level of current the EV 102 is capable of receiving during the charging session, and can control the supplied power accordingly.

The EVSE 110 can be coupled to the gateway system 100. EV lines 100A-100B can run through the EVSE 110. Here, the EV line 110A is coupled to the line 100A, and the EV line 110B is coupled to the line 100B. The EV lines 110A-110B provide part electrical connection between the EV 102 and the gateway system 100. Namely, the EV 102 provides a line 102A (sometimes referred to as L1) that the EVSE 110 can couple to the line 110A. The EV 102 also provides a line 102B (sometimes referred to as L2) that the EVSE 110 can couple to the line 110B. A voltage V can be provided between the lines 102A-102B. For example, the voltage V can be about 240V. However, the EV 102 has no neutral line in its charge port, and accordingly any charging connector compatible with such a charge port is also without a neutral port. For example, this is the case with charging connectors and charge ports according to the J1772 standard defined by the organization SAE International.

Turning again to the gateway system 100, it is coupled to one or more electric circuits of the building 104 to supply power to various electrical equipment. Here, electric apparatuses at the building 104 that can consume electric energy are schematically represented by loads 112A-112C. The load 112A is coupled between the lines 100A and 100C; the load 112B is coupled between the lines 100B and 100C; and the load 112C is coupled between the lines 100A and 100B. Any or all of the loads 112A-C may be a constant load or the load can vary over time (e.g., in a gradual fashion or on/off). Over time, the loads 112A-112B may be substantially the same as each other (in which situation the load can be said to be relatively balanced), or the loads 112A-112B can be significantly different from each other (in which case the load can be said to be relatively unbalanced).

The voltage V of the EV 102 is not split as mentioned earlier. If the loads 112A-112B are significantly unbalanced, then the load 112A may take, say, 10 amperes (A) while the load 112B takes a significantly different amount of current, such as 1A. If the voltage V of the EV 102 were applied to significantly unbalanced loads, the resulting voltages over the respective loads may be substantially different from each other. For example, here the voltage on the load 112A at 1A may be very low (significantly less than the voltage V), wherein most of the voltage V is placed across the load 112B at 1A.

For these and/or other reasons, the gateway system 100 can include a balancing converter 114. The balancing converter 114 is based on power electronics and balances the respective voltages over the loads 112A-112B with each other. The balancing converter 114 uses solid-state electronics (sometimes referred to as semiconductor electronics) to effectively move load between the lines 100A and 100B so as to balance their respective power levels. That is, the balancing converter 114 can balance power from the EV lines 110A-110B between the lines 100A-100B of the gateway system 100.

The gateway system 100 for the building 104 is an example of a gateway system that includes a first relay (e.g., the relay 108A) to couple a first line (e.g., the line 100A) of the gateway system to a first grid line (e.g., the grid line 106A) of a power grid (e.g., the power grid 106). The gateway system includes a second relay (e.g., the relay 108B) to couple a second line (e.g., the line 100B) of the gateway system to a second grid line (e.g., the grid line 106B) of the power grid. The gateway system includes a neutral line (e.g., the line 100C) coupled to a neutral grid line (e.g., the grid line 106C) of the power grid. The gateway system includes a first EV line (e.g., the EV line 110A) coupled to the first line of the gateway system. The first EV line is configured for being coupled to a first line (e.g., the line 102A) of an EV charging connector (e.g., from the EVSE 110). The gateway system includes a second EV line (e.g., the EV line 110B) coupled to the second line of the gateway system. The second EV line is configured for being coupled to a second line (e.g., the line 102B) of the EV charging connector. The EV charging connector has no neutral line. The gateway system includes a balancing converter (e.g., the balancing converter 114) coupled to the first and second lines of the gateway system.

Figure 2:
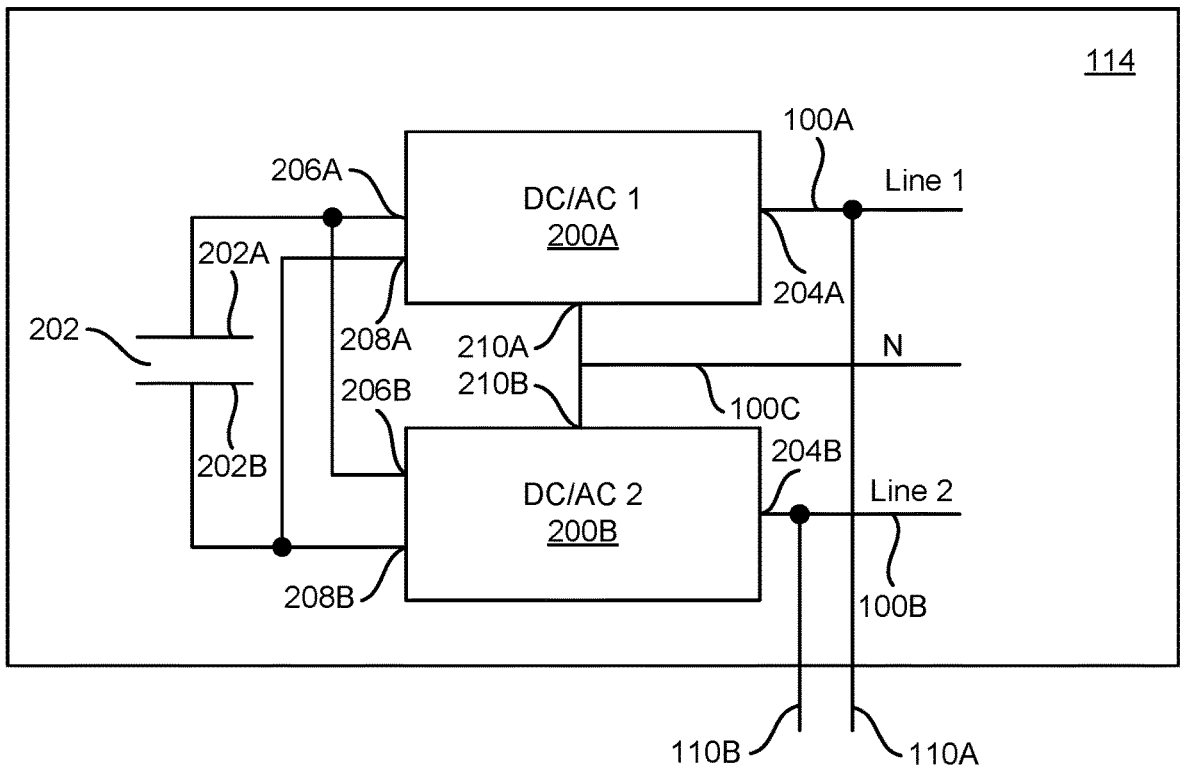
FIG. 2 shows an example of the balancing converter of FIG. 1.

FIG. 2 shows an example of the balancing converter 114 of FIG. 1. The balancing converter 114 as exemplified here can be used with one or more other examples described elsewhere herein. Here, the balancing converter 114 includes DC/AC converters 200A and 200B, and a DC capacitor 202. The DC/AC converters 200A and 200B are here bidirectional. In this example, the DC/AC converter 200A on its right side is coupled to the line 100A, which carries AC. On the left side of the DC/AC converter 200A is a DC circuit to be described below. Thus, the nomenclature "DC/AC" of the DC/AC converter 200A reflects the spatial orientation of the DC circuit and the AC-carrying line 100A, respectively, in this example. If the components instead sat in the opposite sequence, the DC/AC converter 200A could be referred to as an AC/DC converter. With a similar change, the DC/AC converter 200B could instead be referred to as an AC/DC converter.

The DC/AC converter 200A includes an AC terminal 204A coupled to the line 100A of the gateway system 100. The DC/AC converter 200A includes a DC terminal 206A coupled to a first terminal 202A of the DC capacitor 202. The DC/AC converter 200A includes a DC terminal 208A. The DC/AC converter 200A includes a neutral terminal 210A coupled to the neutral line 100C.

The DC/AC converter 200B includes an AC terminal 204B coupled to the line 100B of the gateway system 100. The DC/AC converter 200B includes a DC terminal 206B coupled to the DC terminal 206A of the DC/AC converter 200A. The DC/AC converter 200B includes a DC terminal 208B coupled to a second terminal 202B of the DC capacitor 202. The DC/AC converter 200B includes a neutral terminal 210B coupled to the neutral line 100C.

The balancing converter 114 including the DC/AC converters 200A-200B can balance power from the EV lines 110A-110B between the lines 100A-100B of the gateway system 100.

The DC/AC converters 200A-200B can engage in communication as part of balancing the voltages/power of the system. In some implementations, the DC/AC converters 200A-200B can be implemented in a common package with each other. This can provide for internal controls and communications. For example, the DC/AC converters 200A-200B can be operated by a common controller.

Figure 3:
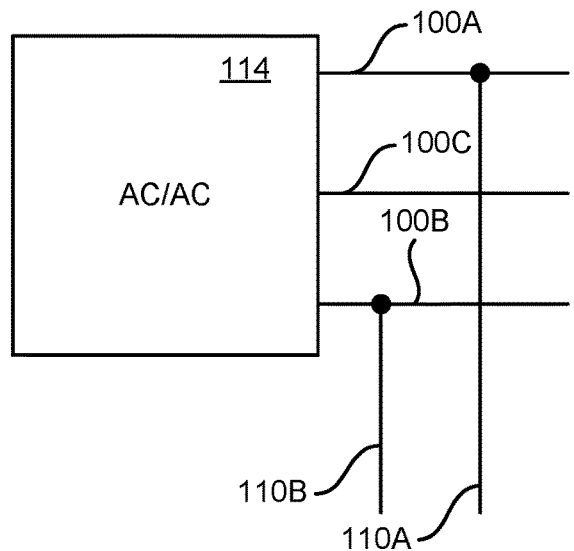
FIG. 3 shows another example of the balancing converter of FIG. 1.

FIG. 3 shows another example of the balancing converter 114 of FIG. 1. The balancing converter 114 as exemplified here can be used with one or more other examples described elsewhere herein. Here, the balancing converter 114 includes an AC/AC converter. The AC/AC converter is coupled to the lines 100A-100B, and to the EV lines 110A-110B.

The balancing converter 114 including the AC/AC converter can balance power from the EV lines 110A-110B between the lines 100A-100B of the gateway system 100.

Figure 4:
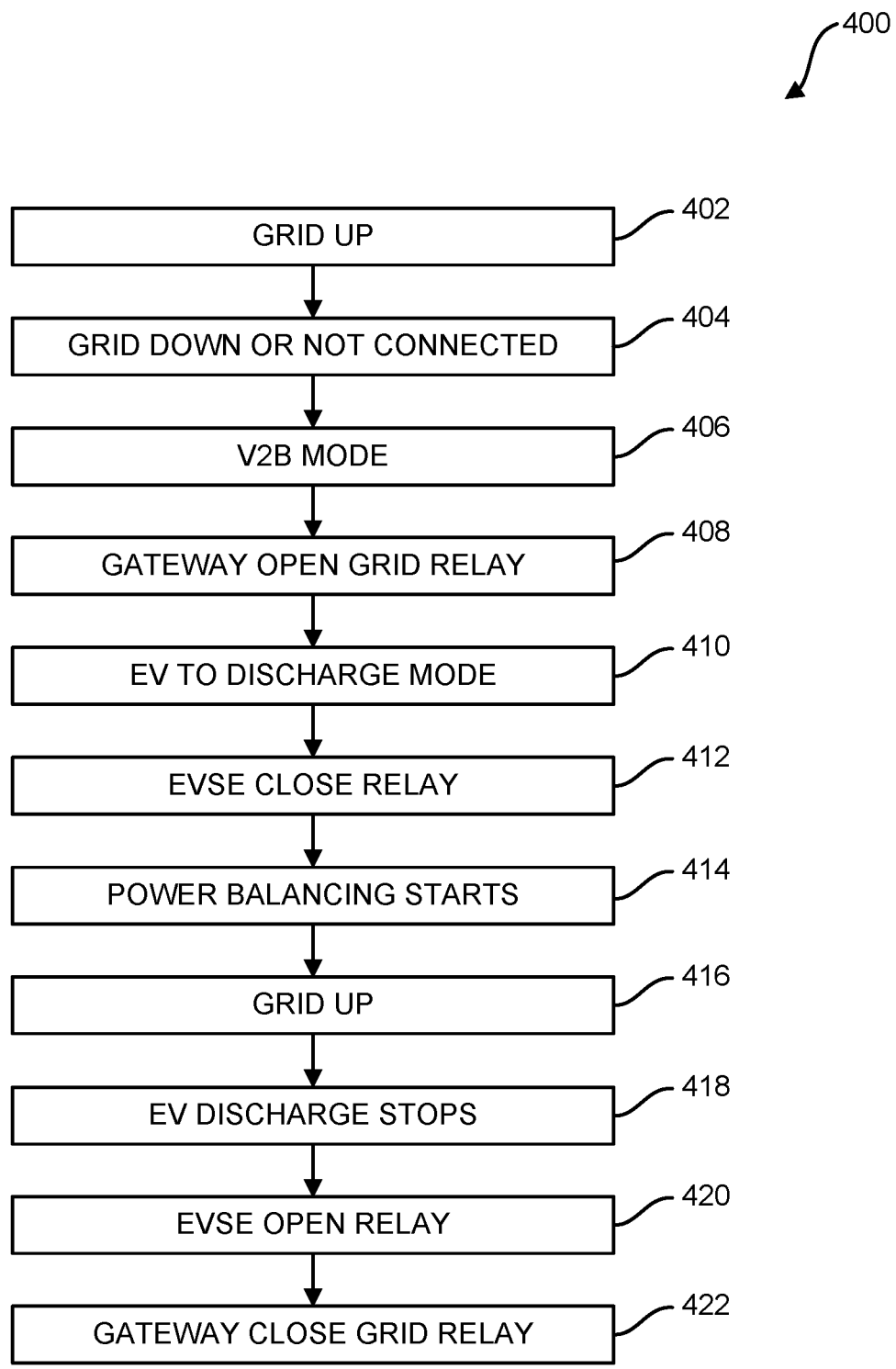
FIG. 4 shows a flowchart with an example of a method for balancing power from an EV.

FIG. 4 shows a flowchart with an example of a method 400 for balancing power from an EV. The method 400 can be used with one or more other examples described elsewhere herein. Some operations may be alternative, or optional, as indicated below. More or fewer operations can be performed. Two or more operations can be performed in a different order unless otherwise indicated.

At operation 402, a power grid can be functioning normally, sometimes referred to as the grid being up. For example, the power grid 106 (FIG. 1) can then power the loads 112A-112C of the building 104.

At operation 404, it can be detected that the power grid is down, or that the system is no longer connected the power grid. For example, this detection can be made by the gateway system 100 (FIG. 1).

At operation 406, it can be determined whether an EV should enter a vehicle-to-building (V2B) operating mode. In some implementations, the EV 102 (FIG. 1) has a human-machine interface that allows a user to begin a session where the EV 102 will be used for powering the building 104. As another example, the user can initiate such operation using the EVSE 110. The following description involves the EV entering the V2B operating mode.

At operation 408, the gateway can open the relay(s) to the power grid. For example, this operation can be performed by the gateway system 100 (FIG. 1).

At operation 410, the EV can be brought into discharge mode. For example, this involves an onboard charger of the EV operating to convert DC from the EV's energy storage into AC. As another example, the EV provides DC to a DC/AC converter external to the EV.

At operation 412, an EVSE can close a relay to the EV. For example, the EVSE 110 can close the relay to the EV 102.

At operation 414, power balancing can start. In some implementations, power from the EV 102 can be balanced. For example, the balancing converter 114 (FIGS. 1, 2, and/or 3) can balance power from the EV lines 110A-110B between the lines 100A-100B of the gateway system 100.

At operation 416, it can be detected that the power grid is up, or that the system is again connected the power grid. For example, this detection can be made by the gateway system 100 (FIG. 1).

At operation 418, the discharge from the EV can be stopped. In some implementations, the EV discharge can be turned off in response to the detection in the operation 416. For example, the gateway system 100 (FIG. 1) can communicate with the EV to cause the EV to stop the discharge. As another example, the EVSE 110 (FIG. 1) can communicate with the EV to cause the EV to stop the discharge. In some implementations, the EV discharge can be stopped for a reason not related to the status of the power grid. For example, a user cancels the V2B session; a specified duration for the V2B session expires; or a state of charge of the EV energy storage becomes too low.

At operation 420, the EVSE can open its relay. In some implementations, this can disconnect the EV 102 (FIG. 1) from the gateway system 100. For example, this opening of the EVSE connection can be performed in response to the detection in the operation 416 whether or not the EV has ceased discharging energy.

At operation 422, the gateway can close the relay(s) to the power grid. For example, this operation can be performed by the gateway system 100 (FIG. 1).

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A gateway system for a building, the gateway system comprising:
   a first relay to couple a first line of the gateway system to a first grid line of a power grid;
   a second relay to couple a second line of the gateway system to a second grid line of the power grid;
   a neutral line coupled to a neutral grid line of the power grid;
   a first electric-vehicle (EV) line coupled to the first line of the gateway system, the first EV line configured for being coupled to a first line of an EV charging connector;
   a second EV line coupled to the second line of the gateway system, the second EV line configured for being coupled to a second line of the EV charging connector, wherein the EV charging connector has no neutral line; and
   a balancing converter coupled to the first and second lines of the gateway system.

2. The gateway system of claim 1, wherein the balancing converter is based on power electronics.

3. The gateway system of claim 2, wherein the power electronics include an AC/AC converter coupled to the first and second EV lines, and to the first and second lines of the gateway system.

4. The gateway system of claim 2, wherein the power electronics include at least first and second AC/DC converters, and a DC capacitor.

5. The gateway system of claim 4, wherein each of the first and second AC/DC converters is bidirectional.

6. The gateway system of claim 5, wherein:
   the first AC/DC converter includes:
     an AC terminal coupled to the first line of the gateway system;
     a first DC terminal coupled to a first terminal of the DC capacitor;
     a second DC terminal; and
     a neutral terminal coupled to the neutral line; and
   the second AC/DC converter includes:
     an AC terminal coupled to the second line of the gateway system;
     a first DC terminal coupled to the first DC terminal of the first AC/DC converter;
     a second DC terminal coupled to a second terminal of the DC capacitor; and
     a neutral terminal coupled to the neutral line.

7. A method comprising:
   detecting, by a gateway system, that a power grid is no longer providing power to first and second lines of the gateway system;
   detecting, by the gateway system, that an electric vehicle (EV) is providing power through first and second EV lines coupled to the first and second lines of the gateway system, respectively, wherein the EV has no neutral line; and
   balancing, by the gateway system using a balancing converter, the power from the EV between the first and second lines of the gateway system.

8. The method of claim 7, wherein the balancing converter is based on power electronics.

9. The method of claim 8, wherein the power electronics include an AC/AC converter coupled to the first and second EV lines, and to the first and second lines of the gateway system.

10. The method of claim 8, wherein the power electronics include at least first and second AC/DC converters, and a DC capacitor.

11. The method of claim 8, further comprising opening, by the gateway system and in response to detecting that the power grid is no longer providing power to the first and second lines of the gateway system, at least one relay that couples the first and second lines of the gateway system to first and second grid lines of the power grid, respectively, wherein the power grid further includes a neutral grid line.

12. The method of claim 11, further comprising detecting, by the gateway system and after detecting that the EV is providing power, that the power grid is again providing power to the first and second lines of the gateway system.

13. The method of claim 12, further comprising causing, by the gateway system and after detecting that the power grid is again providing power, the EV to stop providing power through the first and second EV lines.

14. The method of claim 12, wherein the first and second EV lines run through EV supply equipment, the method further comprising opening, by the gateway system and after detecting that the power grid is again providing power, a relay in the EV supply equipment.

15. A gateway system for a building, the gateway system comprising:
- a first relay to couple a first line of the gateway system to a first grid line of a power grid;
- a second relay to couple a second line of the gateway system to a second grid line of the power grid;
- a neutral line coupled to a neutral grid line of the power grid;
- a first electric-vehicle (EV) line coupled to the first line of the gateway system, the first EV line configured for being coupled to a first line of an EV charging connector;
- a second EV line coupled to the second line of the gateway system, the second EV line configured for being coupled to a second line of the EV charging connector, wherein the EV charging connector has no neutral line; and
- power electronics means for balancing power from the first and second EV lines between the first and second lines of the gateway system.

\* \* \* \* \*